(12) United States Patent
Kim

(10) Patent No.: US 9,595,086 B2
(45) Date of Patent: Mar. 14, 2017

(54) IMAGE PROCESSING DEVICE, IMAGE PROCESSING SYSTEM AND METHOD FOR IMAGE PROCESSING

(71) Applicant: Dong-Hoon Kim, Seongnam-si (KR)

(72) Inventor: Dong-Hoon Kim, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/796,537

(22) Filed: Jul. 10, 2015

(65) Prior Publication Data

US 2016/0071252 A1 Mar. 10, 2016

Related U.S. Application Data

(60) Provisional application No. 62/045,643, filed on Sep. 4, 2014.

(30) Foreign Application Priority Data

Nov. 27, 2014 (KR) .......................... 10-2014-0167384

(51) Int. Cl.
*G06K 9/00* (2006.01)
*H04N 1/46* (2006.01)
*H04N 9/73* (2006.01)
*G06T 5/00* (2006.01)
*G06T 5/40* (2006.01)
*G06T 7/40* (2006.01)

(52) U.S. Cl.
CPC .............. *G06T 5/009* (2013.01); *G06T 5/40* (2013.01); *G06T 7/408* (2013.01); *H04N 9/73* (2013.01)

(58) Field of Classification Search
CPC .... G06T 5/009; G06T 5/40; G06T 7/404; G06T 2207/10024; G06T 7/408; H04N 5/235; H04N 5/2351; H04N 1/6077; H04N 9/73; H04N 5/2353
USPC .......... 382/167; 348/223.1; 35/516; 358/516
See application file for complete search history.

(56) References Cited

U.S. PATENT DOCUMENTS 7,002,627 B1 * 2/2006 Raffy ..................... H04N 9/045
                                                          345/604
7,289,128 B2 * 10/2007 Fukasawa ............ H04N 1/6027
                                                          345/589

(Continued)

FOREIGN PATENT DOCUMENTS

JP      2005-236651 A    9/2005
JP      2007-295062 A    11/2007

(Continued)

*Primary Examiner* — Kanjibhai Patel
(74) *Attorney, Agent, or Firm* — Harness, Dickey & Pierce, P.L.C.

(57) ABSTRACT

An image processing device includes a gatherer configured to receive image data and gather statistics of color data from the image data. The image processing device includes a processor configured to analyze the statistics of the color data to determine whether the image data includes single color data or multi color data, determine a first gain value to perform an automatic white balance if the image data includes multi color data, and determine a second gain value different from the first gain value using a gain table if the image data includes single color data. The image processing device includes a gain applier configured to apply the first gain value or the second gain value to the color data.

16 Claims, 15 Drawing Sheets

(56) References Cited

U.S. PATENT DOCUMENTS

| | | | | |
|---|---|---|---|---|
| 7,822,269 | B2 * | 10/2010 | Tsukada | H04N 1/6033 |
| | | | | 382/167 |
| 7,948,528 | B2 * | 5/2011 | Takahashi | G03B 7/16 |
| | | | | 348/223.1 |
| 8,334,930 | B2 * | 12/2012 | Kim | G09G 5/02 |
| | | | | 348/658 |
| 8,339,474 | B2 * | 12/2012 | Prieto | H04N 5/217 |
| | | | | 348/222.1 |
| 8,427,550 | B2 * | 4/2013 | Ogasahara | G06T 5/009 |
| | | | | 348/223.1 |
| 8,614,750 | B2 | 12/2013 | Kim et al. | |
| 8,698,918 | B2 * | 4/2014 | Silverstein | H04N 9/735 |
| | | | | 348/223.1 |
| 8,704,910 | B2 | 4/2014 | Kim et al. | |
| 9,219,897 | B2 * | 12/2015 | Chuang | H04N 9/646 |
| 2014/0043501 | A1 | 2/2014 | Lee | |

FOREIGN PATENT DOCUMENTS

| | | |
|---|---|---|
| JP | 2013-074536 A | 4/2013 |
| KR | 100738179 B1 | 7/2007 |
| KR | 2008-0077742 A | 8/2008 |
| KR | 100999886 B1 | 12/2010 |
| KR | 101026049 B1 | 3/2011 |

\* cited by examiner

1001

1100

1200

IMAGE PROCESSING DEVICE, IMAGE PROCESSING SYSTEM AND METHOD FOR IMAGE PROCESSING

CROSS-REFERENCE TO RELATED APPLICATION

This application claims priority to Provisional Application No. 62/045,643 filed on Sep. 4, 2014 and claims priority under 35 U.S.C. §119 to Korean Patent Application No. 10-2014-0167384 filed on Nov. 27, 2014 in the Korean Intellectual Property Office, the contents each of which are herein incorporated by reference in their entirety.

BACKGROUND

1. Field of the Inventive Concepts

The inventive concepts relate to an image processing device, an image processing system and/or a method for image processing.

2. Description of the Related Art

In general, automatic white balancing refers to an imaging technique of accurately reproducing a white object as a white image according to a light source illuminating the white object, such as sunlight, a fluorescent lamp, an incandescent room lamp, or the like.

Since human beings are adapted to colors, they can properly distinguish color differences of an object depending on the change in the lighting and location. However, since cameras are not adapted to colors, color differences of an object are reproduced according to the lighting and location. Accordingly, in order to control a phenomenon that changes colors of an object according to light sources of a camera, an automatic white balance technique is employed.

In the automatic white balance technique, generally, grey areas of an input image are searched and gains of various channels are adjusted using an average of RGB values or chrominance signals (R-Y) (B-Y) of image data corresponding to the searched grey areas.

SUMMARY

The inventive concepts provide an image processing device, which can improve a picture quality of an output image by calculating a white balance gain value selectively for multi color data or single color data included in an input image using a pre-defined gain table for a single color, rather than indiscriminately performing an automatic white balance.

The inventive concepts also provide an image processing system, which can improve a picture quality of an output image by calculating a white balance gain value selectively for multi color data or single color data included in an input image using a pre-defined gain table for a single color rather than indiscriminately performing an automatic white balance.

According to at least one example embodiment, an image processing device includes a gatherer configured to receive image data and gather statistics of color data from the image data. The image processing device includes a processor configured to analyze the statistics of the color data to determine whether the image data includes single color data or multi color data, determine a first gain value to perform an automatic white balance if the image data includes multi color data, and determine a second gain value different from the first gain value using a gain table if the image data includes single color data. The image processing device includes a gain applier configured to apply the first gain value or the second gain value to the color data.

According to at least one example embodiment, the processor is configured to receive the image data and calculate the second gain value from the gain table based on a brightness value of the image data.

According to at least one example embodiment, the processor is configured to receive the image data and calculate the second gain value from the gain table based on a color distribution of the image data.

According to at least one example embodiment, the processor is configured to acquire the color distribution by calculating an average value of the color data or a weighted average value of the color data.

According to at least one example embodiment, the image data includes a plurality of portions of image data acquired from a plurality of blocks of an input image.

According to at least one example embodiment, each of the blocks includes a plurality of pixels.

According to at least one example embodiment, the gatherer is configured to receive the image data and gather the color data on a per block basis or a per pixel basis.

According to at least one example embodiment, the processor is configured to project the color data onto a color space and determine whether the color data is single color data or multi color data using the color space.

According to at least one example embodiment, the color space includes a normalized color space, hue, saturation and intensity (HIS) color spaces, or a lab color space.

According to at least one example embodiment, the processor is configured to calculate a standard deviation value or a deviation value of the color data projected onto the color space and determine whether the color data is single color data or multi color data based on the standard deviation or the deviation value.

According to at least one example embodiment, the processor is configured to determine whether the color data is single color data using a principle component analysis (PCA) method.

According to at least one example embodiment, an image processing system includes an image processing device configured to divide image data into first to nth blocks, where n is a natural number of 2 or greater, gather statistics of first to nth color data for the first to nth blocks, analyze the statistics of the first to nth color data to determine whether the image data includes single color data, determine a gain value using a gain table if the image data includes single color data, and apply the determined gain value to the first to nth color data; and an internal memory configured to store the gain table and supply the gain value to the image processing device.

According to at least one example embodiment, the image processing device and the internal memory are part of an application processor.

According to at least one example embodiment, the image processing system includes an external memory external to the application processor and configured to supply the image data to the image processing device.

According to at least one example embodiment, the processor is configured to calculate the gain value from the gain table based on a brightness value of the image data.

According to at least one example embodiment, the processor is configured to calculate the gain value from the gain table based on a color distribution of the image data.

According to at least one example embodiment, the processor is configured to project the first to nth color data onto a color space and determine whether the first to nth color data are single color data using the color space.

According to at least one example embodiment, the color space includes a normalized color space, hue, saturation and intensity (HIS) color spaces, or a lab color space.

According to at least one example embodiment, the processor is configured to calculate a standard deviation value or a deviation value of the first to nth color data projected onto the color space and determine whether the first to nth color data are single color data based on the standard deviation value or the deviation value.

According to at least one example embodiment, the processor is configured to determine whether the first to nth color data are single color data using a principle component analysis (PCA) method.

According to at least one example embodiment, an image processing system includes an image processing device configured to divide image data into first to nth blocks, where n is a natural number of 2 or greater, and gather statistics of first to nth color data for the first to nth blocks. The image processing system includes a central processing unit configured to receive the statistics of the first to nth color data from the image processing device to determine whether the image data includes single color data, and if the image data includes single color data, determine a gain value using a gain table. The image processing system includes an internal memory configured to store the gain table and supply the gain value to the central processing unit.

According to at least one example embodiment, the image processing device, the central processing unit, and the internal memory are part of an application processor.

According to at least one example embodiment, the image processing system includes an external memory external to the application processor and configured to supply the image data to the image processing device.

According to at least one example embodiment, the central processing unit is configured to calculate the gain value from the gain table based on a brightness value of the image data.

According to at least one example embodiment, the central processing unit is configured to calculate the gain value from the gain table based on a color distribution of the image data.

According to at least one example embodiment, the central processing unit is configured to project the first to nth color data onto a color space and determine whether the first to nth color data are single color data using the color space.

According to at least one example embodiment, the color space includes a normalized color space, hue, saturation and intensity (HIS) color spaces, or a lab color space.

According to at least one example embodiment, wherein the central processing unit is configured to calculate a standard deviation value or a deviation value on the first to nth color data projected onto the color space and determine whether the first to nth color data are single color data based on the standard deviation value or the deviation value.

According to at least one example embodiment, wherein the central processing unit is configured to determine whether the first to nth color data are single color data using a principle component analysis (PCA) method.

According to at least one example embodiment, a method includes receiving image data and gathering statistics of color data from the image data, and projecting the color data onto a color space based on the gathered statistics. The method includes analyzing the projected color data to determine whether the image data includes single color data or multi color data. If the image data includes multi color data, the method includes performing an automatic white balance operation on the color data, and if the image data includes single color data, the method includes applying a gain value determined using a gain table to the color data.

According to at least one example embodiment, the gain value is calculated from the gain table based on a brightness value of the image data.

According to at least one example embodiment, the gain value is calculated from the gain table based on a color distribution of the image data.

According to at least one example embodiment, the color space includes a normalized color space, hue, saturation and intensity (HIS) color spaces, or a lab color space.

According to at least one example embodiment, the determining whether the image data includes single color data or multi color data is performed by calculating a standard deviation value or a deviation value on the color data projected onto the color space.

According to at least one example embodiment, the determining whether the image data includes single color data or multi color data performed using a principle component analysis (PCA) method.

According to at least one example embodiment, an image processing device includes a processor configured to determine whether image data includes single color data or multi color data based on statistics of received color data, apply a first gain value to the image data if the image data includes multi color data, the first gain value being associated with a white balance operation, and apply a second gain value to the image data if the image data includes single color data. The second gain value may be different from the first gain value.

According to at least one example embodiment, the processor is configured to generate an image using the image data to which the first gain value or the second gain value is applied.

According to at least one example embodiment, the processor is configured to retrieve the second gain value from a gain table based on a brightness value of the image data.

According to at least one example embodiment, the processor is configured to retrieve the second gain value from a gain table based on a color distribution of the image data.

According to at least one example embodiment, the processor is configured to generate the color distribution by calculating an average value of the color data or a weighted average value of the color data.

BRIEF DESCRIPTION OF THE DRAWINGS

The above and other features and advantages of the inventive concepts will become more apparent by describing in detail example embodiments thereof with reference to the attached drawings in which.

DETAILED DESCRIPTION OF EXAMPLE EMBODIMENTS

Figure 1:
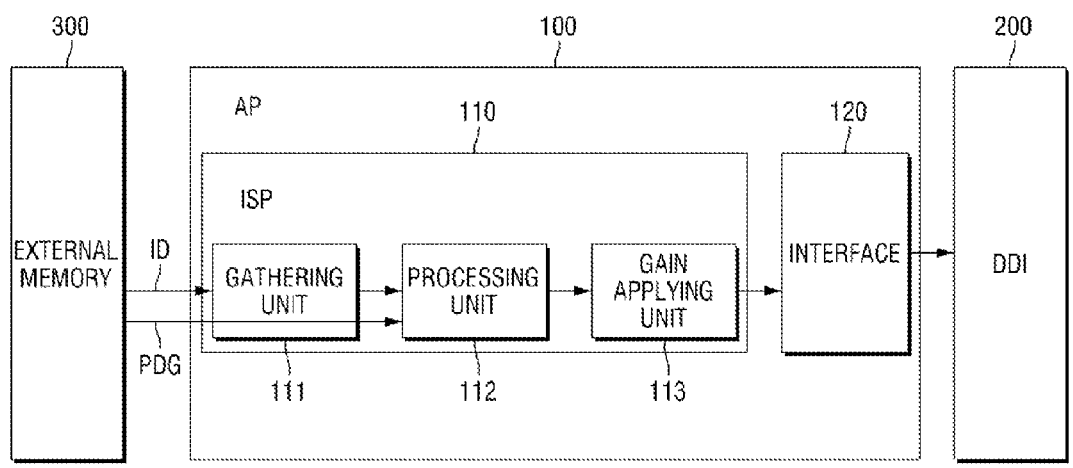
FIG. 1 is a block diagram of an image processing device according to at least one example embodiment of the inventive concepts.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

Figure 2:
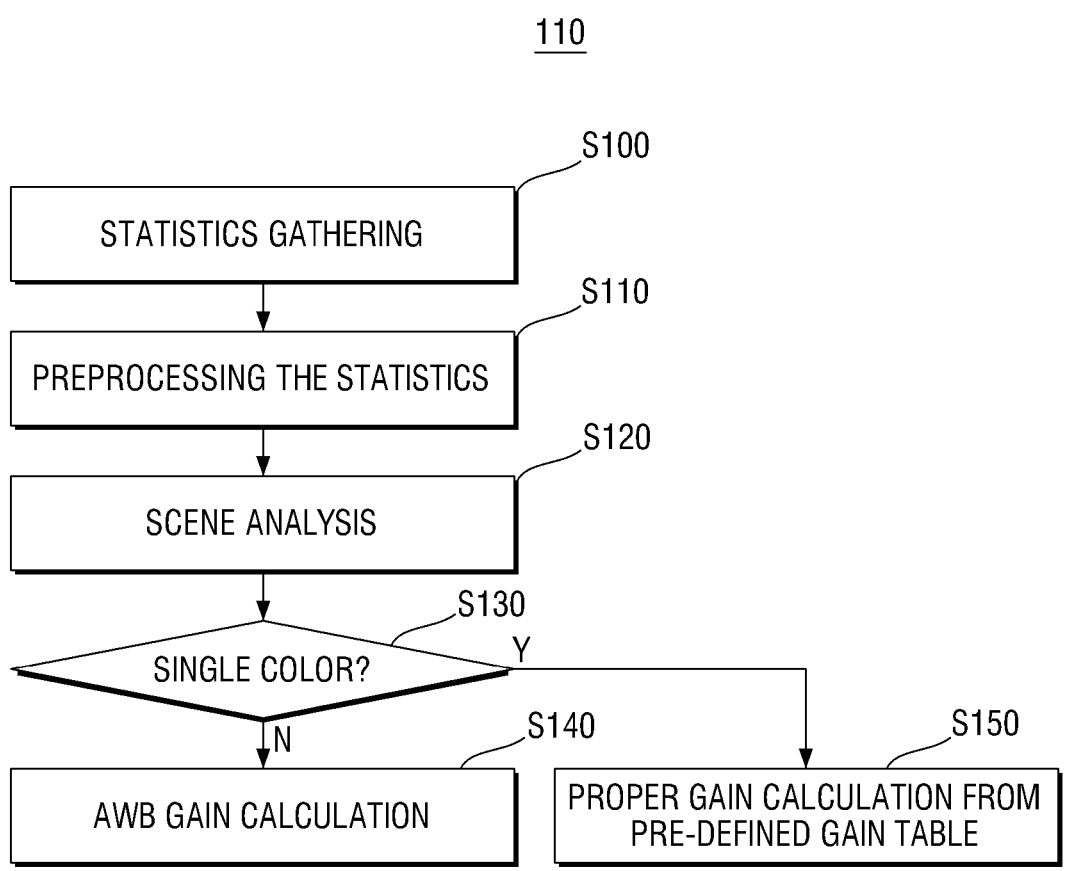
FIG. 2 is a flowchart illustrating a driving method of an image processing according to at least one example embodiment of the inventive concepts.

Hereinafter, an image processing device according to at least one example embodiment of the inventive concepts will be described with reference to FIGS. 1 to 6. FIG. 1 is a block diagram of an image processing device according to at least one example embodiment of the inventive concepts. FIG. 2 is a flowchart illustrating a driving method of an image processing according to at least one example embodiment of the inventive concepts. FIGS. 3 to 6 illustrate a method for analyzing color data according to at least one example embodiment of the inventive concepts.

Referring to FIG. 1, the image processing device 1 includes an application process (AP) 100, a display driver (DDI) 200, and an external memory 300.

The AP 100 may receive image data ID from the external memory 300, may gather color data CD from the image data ID, may analyze the color data CD to determine whether the image data ID includes single color data, and may apply a first gain value or a second gain value to the color data CD.

When the image data ID includes multi color data, the first gain value is a gain value calculated to perform an automatic white balance (AWB), and when the image data ID includes single color data, the second gain value is a gain value calculated using a pre-defined gain table.

The AP 100 may supply a processing result of the image data ID to the DDI 200.

In detail, the AP 100 may include an image signal processor (ISP) 110 and an interface 120. The ISP 110 may include a gathering unit (or gatherer) 111, a processing unit (or processor) 112 and a gain applying unit (or gain applier) 113.

In at least one example embodiment of the inventive concepts, the term "unit" may mean, but not limited to, a software and/or hardware component, such as a Field Programmable Gate Array (FPGA) or Application Specific Integrated Circuit (ASIC), which performs certain tasks. A "unit" may be configured to reside on the addressable storage medium and configured to execute on one or more processors. Thus, a "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operation provided for in the components and modules may be combined into fewer components and modules or further separated into additional components and units.

While FIG. 1 illustrates that the gathering unit 111, the processing unit 112 and the applying unit 113 are all disposed inside the ISP 110 and the ISP 110 and the interface 120 are both disposed inside the AP 100, but example embodiments are not limited thereto.

In at least one example embodiment of the inventive concepts, some of components may be disposed outside the AP 100. For example, the ISP 110 may be disposed outside the AP 100 and the interface 120 may be disposed inside the AP 100.

The gathering unit 111 may receive the image data ID and may gather the color data CD from the image data ID. Here, the gathering unit 111 divides an input image into a plurality of blocks and acquires a plurality of pieces of image data ID from the divided plurality of blocks. Each of the blocks may include a plurality of pixels.

In addition, the gathering unit 111 may gather the image data ID on a basis of the divided blocks or may gather the image data ID on a basis of pixels included in each block. The gathering unit 111 may gather the color data CD from the image data ID.

The processing unit 112 may analyze the color data CD to determine whether the image data ID includes single color data or multi color data, and if the image data ID includes multi color data, may determine a first gain value to perform an automatic white balance (AWB), if the image data ID includes single color data, may determine a second gain value different from the first gain value using a pre-defined gain table GT. The gain table GT may contain one or more gain values that are associated with different colors of single color data. Accordingly, the second gain value may vary according to a type of single color data.

In particular, in determining the second gain value, the processing unit 112 may determine the second gain value from the gain table GT based on a brightness value or a color distribution of the image data ID for the image data ID including the single color data.

The operation of the processing unit 112 will now be described in more detail.

In the operation of the processing unit 112 analyzing the color data CD to determine whether the image data ID includes single color data, the color data CD is projected onto a color space CS and analyzed to determine whether the color data CD is single color data or not.

For example, the color space CS may be a normalized color space, hue, saturation and intensity (HIS) color spaces, or a lab color space, but example embodiments are not limited thereto. The color data CD may also be projected onto another arbitrary color space CS to be analyzed.

FIGS. 3 to 6 illustrate methods for analyzing color data CD by projecting the color data CD on a preset color space CS.

Here, a normalized color space is used as the color space CS, and the x-axis indicates normalized red values and the y-axis indicates normalized blue values.

Figure 3:
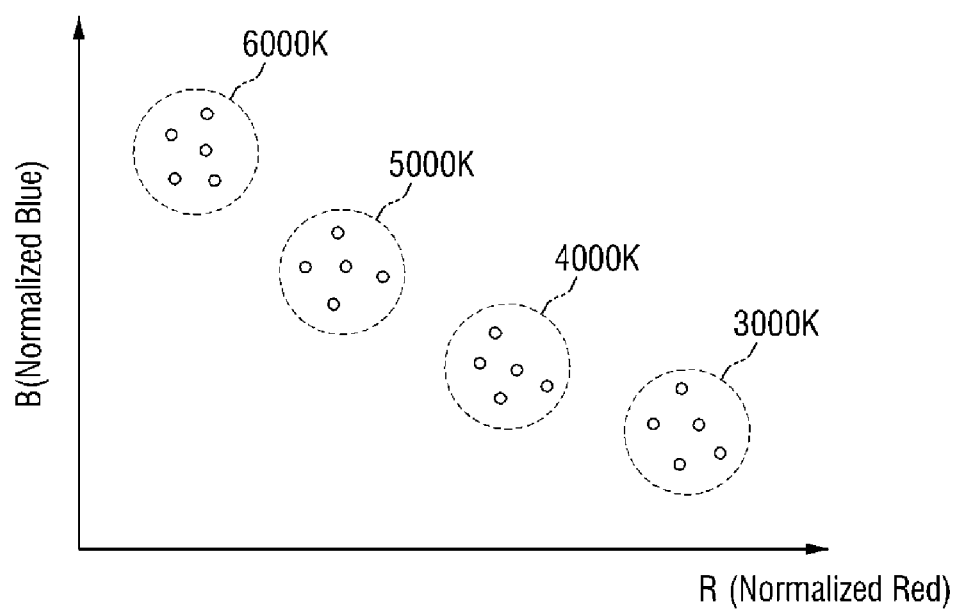
FIGS. 3 to 6 illustrate methods for analyzing color data.

Referring to FIG. 3, points of red values and blue values of a gray chart depending on color temperatures are illustrated. In FIG. 3, points of red values and blue values of the grey chart at color temperatures of 3000K, 4000K, 5000K, and 6000K are illustrated.

Figure 4:
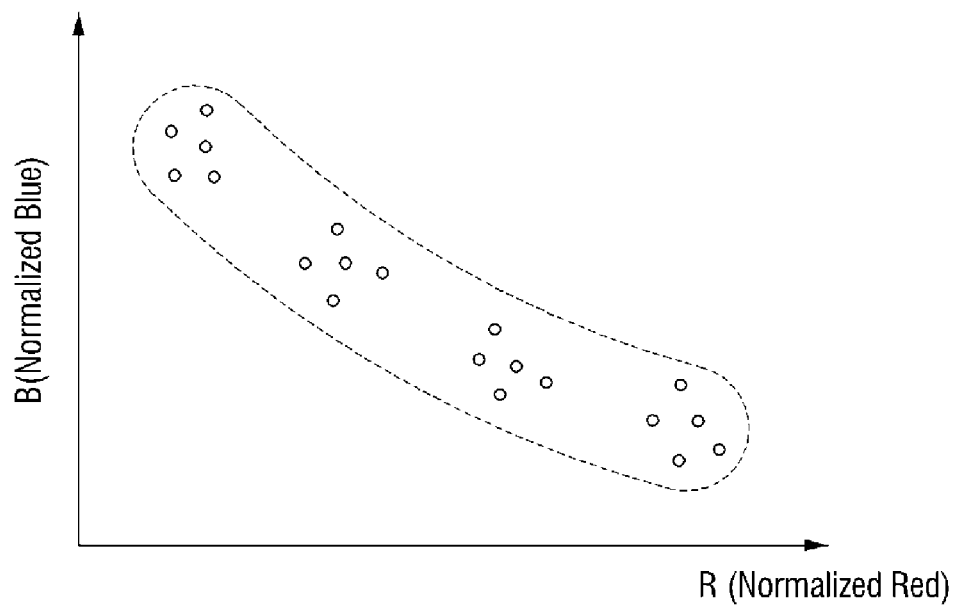
Figure 5:
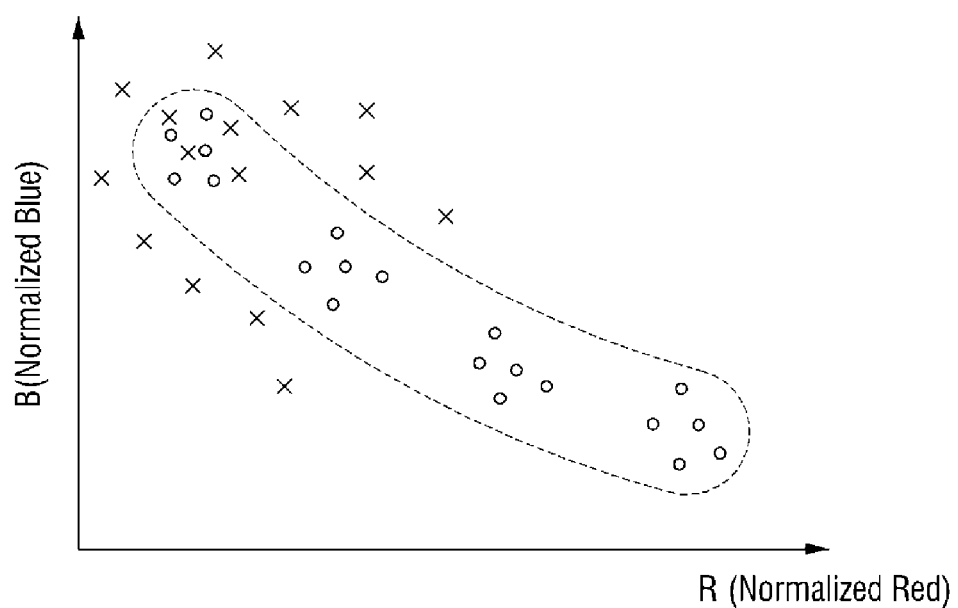

Referring to FIG. 4, reference grey value regions are set by approximation of the points indicated in FIG. 3. FIG. 5 illustrates multi color data (indicated by multiple instances of "x") as the color data CD and FIG. 6 illustrates single color data (indicated by multiple instances of "x") as the color data CD.

When the processing unit 112 analyzes the color data CD, a standard deviation value SDV or a deviation value DV for the color data CD projected on the color space CS color is calculated to determine whether the color data CD is single color data.

Figure 6:
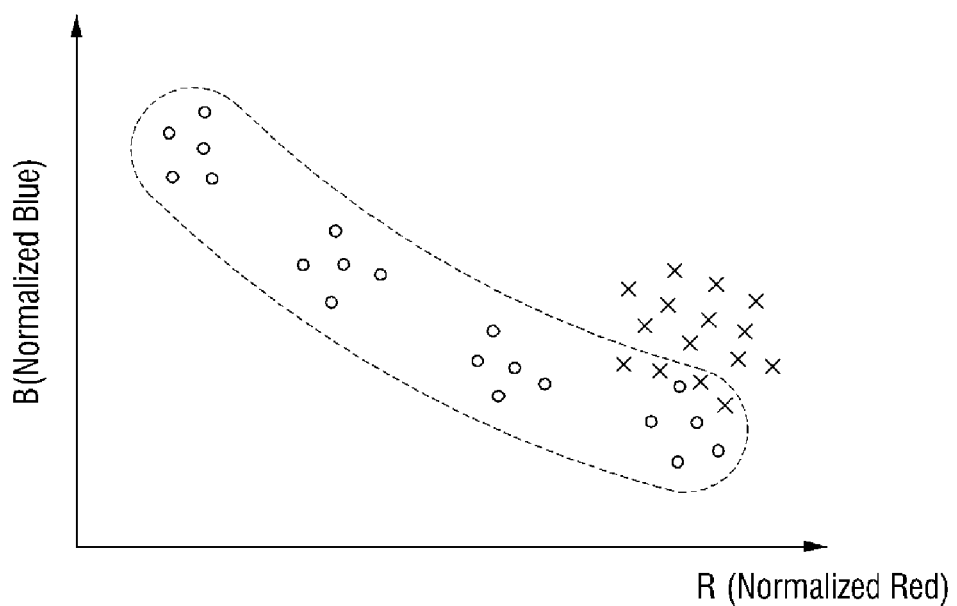

The standard deviation value SDV and the deviation value DV on a point distribution of the color data CD shown in FIG. 6 are smaller than those of a point distribution of the color data CD shown in FIG. 5. If the standard deviation value SDV or the deviation value DV has a desired (or alternatively, predetermined) critical value, it is possible to determine based on the critical value whether the color data CD is single color data.

If the AWB is performed in a conventional manner, four bits of color data CD are included equally in the grey value areas (see FIGS. 5 and 6), and AWB is performed on both of the color data CD shown in FIGS. 5 and 6 (illustrated by the four instances of "x" within the dotted line). When the input image including single color data (FIG. 6) is corrected and output, the image is distorted to then be displayed.

Therefore, the image processing device 1 according to at least one example embodiment of the inventive concepts corrects the input image by determining the second gain value based on the pre-defined gain table GT, instead of performing the AWB on the input image including single color data. As a result, the multi color data and the single color data are corrected with different gain values.

In addition, the processing unit 112 may determine whether the color data CD includes single color data using a principle component analysis (PCA) method. The PCA method is a multivariate statistical analysis technique for analyzing a data distribution by extracting several principle components from a number of variables. The PCA method is generally used for dimension reduction using the principle components.

Alternatively, a YCbCr color space may also be used as the color space CS. The YCbCr color space is a kind of color space used in an imaging system using chrominance signals. YCbCr conversion may be performed using the following relationships:

$Y=0.2990*R+0.5870*G+0.1140*B$ $Cb=-0.1687*R+0.3313*G+0.5000*B$ $Cr=0.5000*R+0.4187*G+0.0813*B$

The processing unit 112 calculates hue and chroma values of the color data CD and as the calculation result If difference values between the calculated hue and chroma values and hue and chroma values of surrounding blocks are greater than desired (or alternatively, predetermined) critical values, it is determined that a pertinent block of the color data CD has a color change.

For all of the blocks included in the input image ID, it is determined whether the blocks have a color change. As the determination result, if the number of blocks having color changes is less than a desired (or alternatively, predetermined) critical value, it is determined that the input image includes single color data.

In chrominance, it should be recognized that the processing unit 112 determining whether the color data CD includes single color data is not limited to the method having described above.

The gain applying unit 113 may apply the first gain value or the second gain value to the color data CD. If the image data ID includes multi color data, the first gain value is applied to the color data CD for image correction. If the image data ID includes single color data, the second gain value is applied to the color data CD for image correction.

In FIG. 1, the gain applying unit 113 is disposed inside the ISP 110, but example embodiments are not limited thereto. The gain applying unit 113 may be disposed outside the ISP 110.

The interface 120 may supply the image data ID having the first gain value or the second gain value applied to the color data CD to the DDI 200.

In at least one example embodiment of the inventive concepts, the interface 120 may include, for example, HS/Link, but example embodiments are not limited thereto.

The DDI 200 may include a frame buffer FB, a driver D, and the like.

The frame buffer FB may be used in buffering the image data ID. Accordingly, the frame buffer FB may further include a storage device for storing the image data ID.

The driver D may receive the image data ID from the frame buffer FB and may generate the image signal IS using the received image data to an output panel. In at least one example embodiment of the inventive concepts, the image data ID received from the frame buffer FB may include, for example, digital data, and the image signal IS output from the driver D may include, for example, analog signals.

In at least one example embodiment of the inventive concepts, the driver D may include a gate driver GD and a source driver SD.

The gate driver GD may sequentially supply gate driving signals to the output panel through gate lines in response to the control of a timing controller TC. In addition, the source driver SD may supply the image signal IS to the output panel through source lines in response to the control of the timing controller TC whenever the gate lines are sequentially selected.

The output panel may include a plurality of pixels. A plurality of gate lines and a plurality of source lines are arranged on the output panel so as to intersect each other in a matrix configuration and intersecting points of the plurality of gate lines and the plurality of source lines may be defined as pixels. In at least one example embodiment of the inventive concepts, the respective pixels may include, for example, a plurality of dots (e.g., RGB dots).

The timing controller TC may control the source driver SD and the gate driver GD. The timing controller TC may receive a plurality of control signals and data signals from an external system. The timing controller TC may generate gate control signals and source control signals in response to the control signals and data signals received from the external system, and may output the gate control signals to the gate driver GD and may output the source control signals to the source driver SD.

The image data ID to be supplied to the AP 100, specifically to the ISP 110, and the pre-defined gain table GT may be stored in the external memory 300. The external memory 300 may supply the image data ID to the AP 100, specifically to the ISP 110, and a pre-defined gain (PDG) value.

In at least one example embodiment of the inventive concepts, the external memory 300 may include, for example, a non-volatile memory device. Examples of the non-volatile memory device may include a NAND flash, a NOR flash, a magnetoresistive random access memory (MRAM), a phase change random access memory (PRAM), and a resistive random access memory (RRAM), but example embodiments are not limited thereto.

Meanwhile, at least one example embodiment of the inventive concepts, the external memory 300 may be modified to be implemented as a hard disk drive, a magnetic storage device, and the like.

A driving method of the image processing device 1, specifically the ISP 110, is illustrated in FIG. 2.

Referring to FIG. 2, the ISP 110 may receive of image data ID and gather statistics of color data CD from the image data ID (S100) and may project the color data CD onto a color space (e.g., a preset color space) CS (S110).

Then, a scene of the projected color data CD is analyzed to determine whether the image data ID includes single color data (S120, S130).

The determining whether the image data ID includes single color data may be performed by calculating a standard deviation value SDV or a deviation value DV of the color data CD projected onto the color space CS or by using a principle component analysis (PCA) method.

If the image data ID includes multi color data, a first gain value for performing AWB is determined (S140). If the image data ID includes single color data, a second gain value is determined using a gain table (e.g., a predefined gain table) GT (S150). The gain table GT may be user defined and/or based on empirical evidence. Here, the second gain value may be calculated (or retrieved) from the gain table GT based on a brightness value or a color distribution of the image data ID.

The determined first gain value or second gain value may be applied to the color data CD to generate a corrected image. The corrected image may then be displayed.

Hereinafter, an image processing device according to at least one example embodiment of the inventive concepts will be described with reference to FIGS. 7 to 9.

Figure 7:
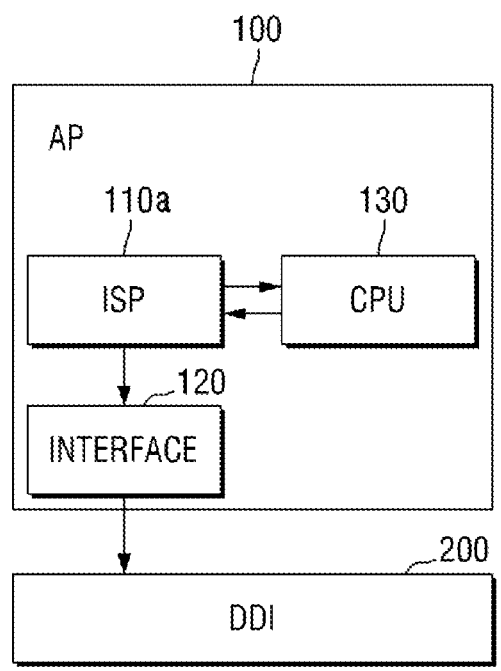
FIG. 7 is a block diagram of an image processing device according to at least one example embodiment of the inventive concepts.

FIG. 7 is a block diagram of an image processing device according to at least one example embodiment of the inventive concepts. For the sake of brevity and convenient explanation, a description of the elements described above will be omitted.

Referring to FIG. 7, the image processing device 2 may include an application processor (AP) 100, and a DDI 200. The AP 100 may include an ISP 110a, an interface 120, and a central processing unit (CPU) 130.

The ISP 110a may divide the image data ID into first to nth blocks (n is a natural number of 2 or greater) and may gather statistics of first to nth color data CD_1 to CD_n for the divided first to nth blocks.

In accordance with the operations of FIG. 2, the CPU 130 may receive and analyze the statistics of first to nth color data CD_1 to CD_n from the ISP 110a to determine whether the image data ID includes single color data or multi color data, may determine a first gain value to perform an AWB if the image data ID includes multi color data, and may determine a second gain value using the pre-defined gain table GT if the image data ID includes single color data.

Figure 8:
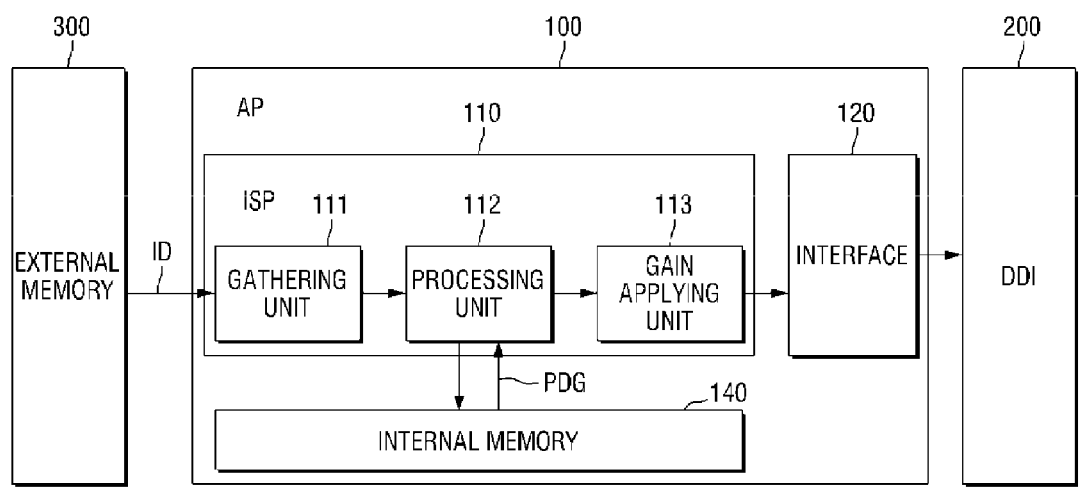
FIG. 8 is a block diagram of an image processing device according to at least one example embodiment of the inventive concepts.

FIG. 8 is a block diagram of an image processing device according to at least one example embodiment of the inventive concepts. For the sake of brevity and convenient explanation, a description of the elements described above will be omitted.

Referring to FIG. 8, the image processing device 3 may include an application processor (AP) 100, a DDI 200, and an external memory 300. The AP 100 may include an ISP 110, an interface 120, and an internal memory 140.

Here, the ISP 110, the interface 120, and the internal memory 140 may be disposed inside the AP 100 and the external memory 300 may be disposed inside the AP 100.

A gain table GT may be stored in the internal memory 140. The internal memory 140 may supply a pre-defined gain (PDG) value to the ISP 110.

The internal memory 140 may include, for example, a non-volatile memory device. Examples of the non-volatile memory device may include a NAND flash, a NOR flash, a magnetoresistive random access memory (MRAM), a programmable read only memory (PROM), and a resistive random access memory (RRAM), but example embodiments are not limited thereto.

The image data ID to be supplied to the AP 100, specifically to the ISP 110 may be stored in the external memory 300. The external memory 300 may supply the image data ID to the AP 100, specifically to the ISP 110.

The external memory 300 may include, for example, a volatile memory device. Examples of the volatile memory device may include a dynamic random access memory (DRAM), but example embodiments are not limited thereto.

Meanwhile, the external memory 300 may include, for example, a non-volatile memory device. Examples of the non-volatile memory device may include a static random access memory (SRAM), a NAND flash, a NOR flash, a magnetoresistive random access memory (MRAM), a programmable random access memory (PRAM), and a resistive read only memory (RRAM), but example embodiments are not limited thereto.

In addition, the external memory 300 may also be modified into a hard disk drive, a magnetic storage device to then be embodied.

Figure 9:
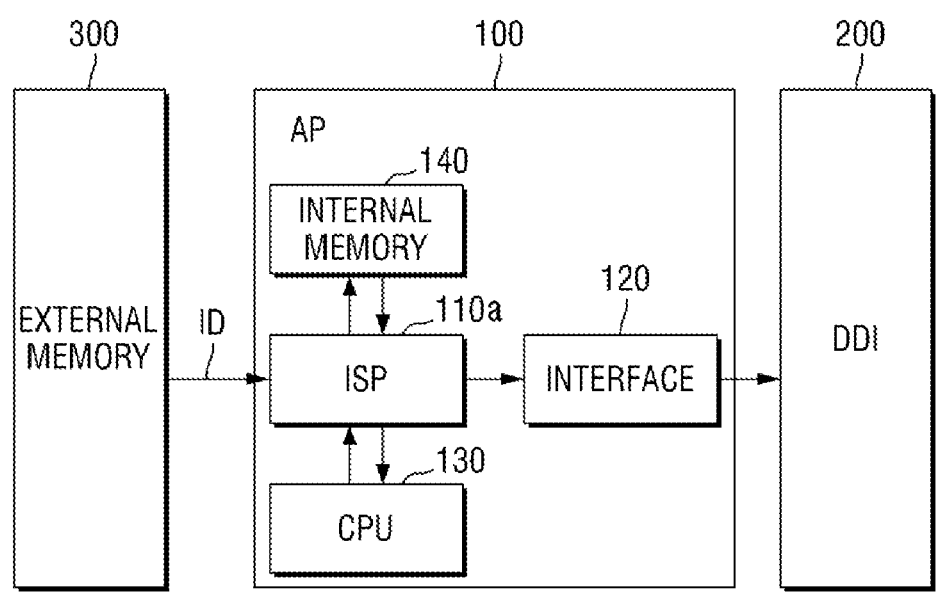
FIG. 9 is a block diagram of an image processing device according to at least one example embodiment of the inventive concepts.

FIG. 9 is a block diagram of an image processing device according to at least one example embodiment of the inventive concepts. For the sake of brevity and convenient explanation, a description of elements described above will be omitted.

Referring to FIG. 9, the image processing device 4 may include an application processor (AP) 100, a DDI 200, and an external memory 300. The AP 100 may include an ISP 110a, an interface 120, a CPU 130, and an external memory 140.

The ISP 110a, the interface 120, the CPU 130 and the external memory 140 may be disposed inside the AP 100, and the external memory 300 may be disposed outside the AP 100.

The above-described image processing devices 2 to 4 are driven in substantially the same manner as the image processing device 1.

Figure 10:
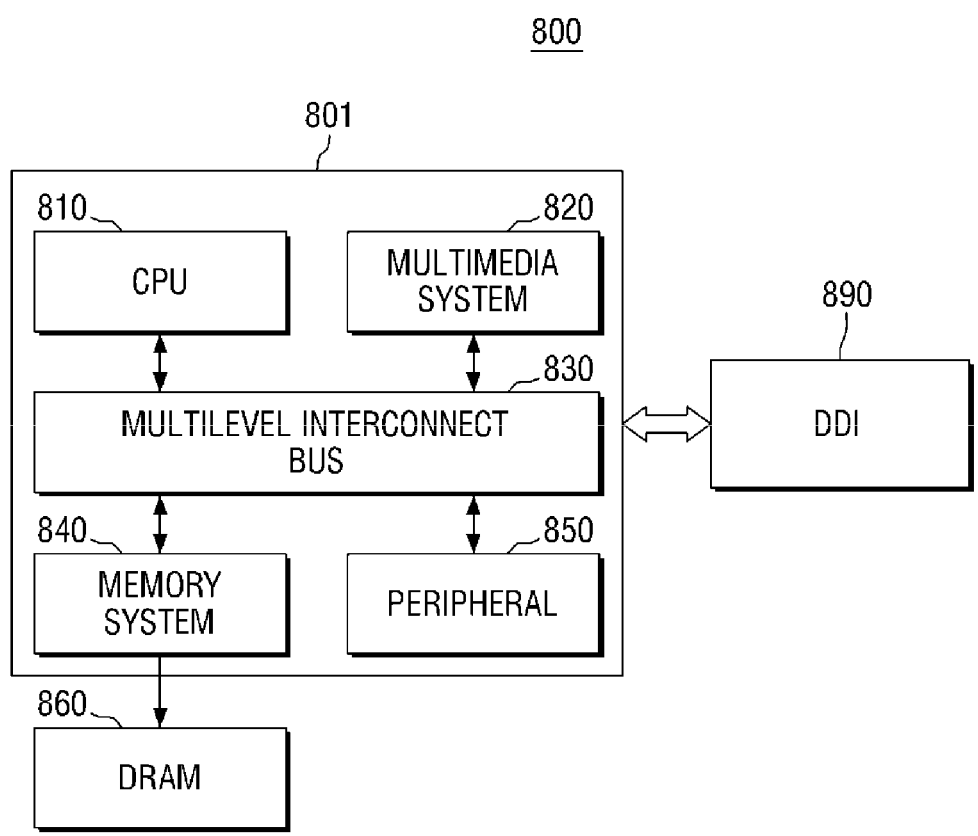
FIG. 10 is a block diagram of an SoC system according to at least one example embodiment of the inventive concepts.

FIG. 10 is a block diagram of a SoC system according to at least one example embodiment of the inventive concepts.

Referring to FIG. 10, the SoC system 800 may include an application processor 801, a DRAM 860 and a DDI 890.

The application processor 801 may include a central processing unit 810, a multimedia system 820, a bus 830, a memory system 840, and a peripheral circuit 850.

The central processing unit 810 may perform operations necessary for operating the SoC system 800. In at least one example embodiment of the inventive concepts, the central processing unit 810 may be configured in a multi-core environment including a plurality of cores.

The multimedia system 820 may be used in performing a variety of multimedia functions in the SoC system 800. The multimedia system 820 may include a 3D engine module, a video codec, a display system, a camera system, and a post-processor.

The bus 830 may be used in performing data communication among the central processing unit 810, the multimedia system 820, the memory system 840, and the peripheral circuit 850. In at least one example embodiments of the inventive concepts, the bus 830 may have a multi-layered structure. In detail, examples of the bus 830 may include a multi-layer advanced high-performance bus (AHB), or a multi-layer advanced extensible interface (AXI), but example embodiments are not limited thereto.

The memory system 840 may provide environments necessary for high-speed operation by connecting the AP 801 to an external memory (for example, the DRAM 860). In at least one example embodiment of the inventive concepts, the memory system 840 may include a separate controller (for example, a DRAM controller) for controlling the external memory (for example, the DRAM 860).

The peripheral circuit 850 may provide environments necessary for smoothly connecting the SoC system 800 to an external device (for example, a main board). Accordingly, the peripheral circuit 850 may include various kinds of interfaces enabling the external device connected to the SoC system 800 to be compatibly used.

The DRAM 860 may function as a working memory required to operate the AP 801. In at least one example embodiment of the inventive concepts, as shown, the DRAM 860 may be disposed outside the AP 801. In detail, the DRAM 860 may be packaged with the AP 801 in the form of a package on package (PoP).

In at least one example embodiment of the inventive concepts, the image data ID of the image processing devices 1 to 4 may be stored in the DRAM 860.

Figure 11:
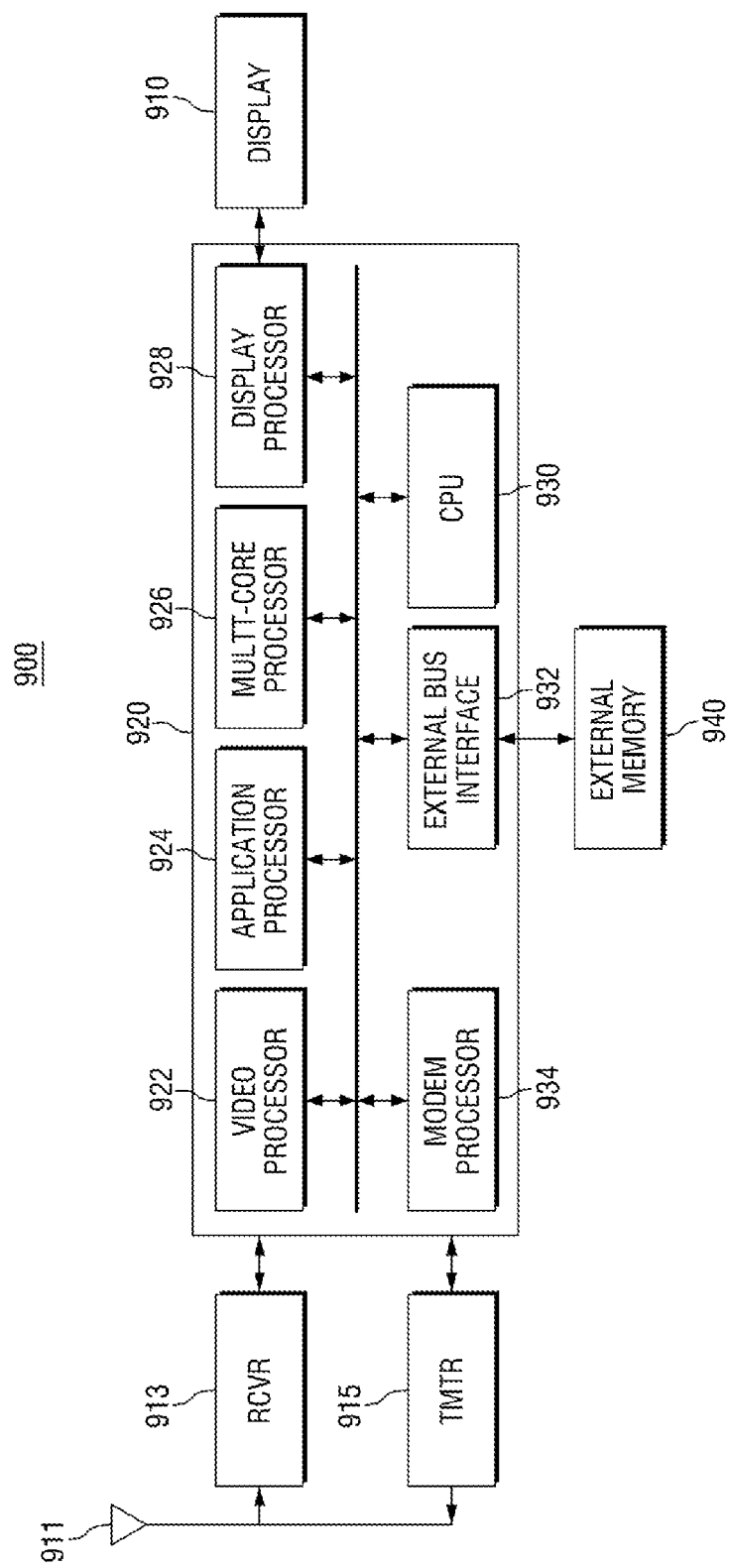
FIG. 11 is a block diagram of a wireless communication according to at least one example embodiment of the inventive concepts.

FIG. 11 is a block diagram of a wireless communication device according to at least one example embodiment of the inventive concepts.

Referring to FIG. 11, the device 900 may be a cellular phone, a smart phone terminal, a handset, a personal digital assistant (PDA), a laptop computer, a video game unit, or other devices.

The device 900 may use code division multiple access (CDMA), time division multiple access (TDMA) such as a global system for mobile communications (GSM), or other wireless communication standards.

The device 900 may provide bi-directional communication by a receiving path and a transmitting path. Signals transmitted from one or more base stations on the receiving path may be received by an antenna 911 or may be provided to a receiver (RCVR) 913. The RCVR 913 may condition and digitalize received signals and may provide the conditioned and digitalized signals to a digital section 920 for further processing. On the transmitting path, a transmitter (TMTR) 915 may receive data transmitted from the digital section 920, may process and condition the received data and may generate a modulated signal. The modulated signal may be transmitted to one or more base stations through the antenna 911.

The digital section 920 may be implemented by one or more of a digital signal processor (DSP), a microprocessor, a reduced instruction set computer (RISC), and the like. In addition, the digital section 920 may be manufactured on one or more of an application specific integrated circuit (ASIC) and other types of integrated circuits (ICs).

The digital section 920 may include, for example, a variety of processing and interface units, such as a modem processor 934, a video processor 922, an application processor 924, a display processor 928, a controller/multi-core processor 926, a CPU 930, and an external bus interface (EBI) 932.

The modem processor 934, the video processor 922, the application processor 924, the display processor 928, the controller/multi-core processor 926, the CPU 930, and the external bus interface (EBI) 932 may be connected to one another through a bus, as shown.

The video processor 922 may perform processing on graphic applications. In general, the video processor 922 may include an arbitrary number of processing units or modules for an arbitrary set of graphic operations.

A particular part of the video processor 922 may be implemented by firmware and/or software. For example, a control part of the video processor 922 may be implemented by firmware and/or software modules (e.g., procedures, functions, etc.) for performing the aforementioned functions. The firmware and/or software codes may be stored in a memory (e.g., the external memory 200 of FIG. 1) or may be executed by a processor (e.g., the multi-core processor 926). The memory may be embodied inside or outside the processor.

The video processor 922 may implement a software interface, such as open graphic library (OpenGL), or Direct3D.

The CPU 930 may perform a series of graphic processing operations together with the video processor 922.

The multi-core processor 926, including at least two cores, may allocate workloads to be processed by the controller/multi-core processor 926 to the at least two cores and may concurrently process the corresponding workloads.

The display processor 928 may perform various graphic processing operations on the image output to the display 910.

At least one of the application processor 924 and the display processor 928 may employ the configuration of each of the image processing devices 1 to 4.

The modem processor 934 may perform various processing operations concerning communication in the digital section 920.

The external bus interface (EBI) 932 may be connected to the external memory 940.

Figure 12:
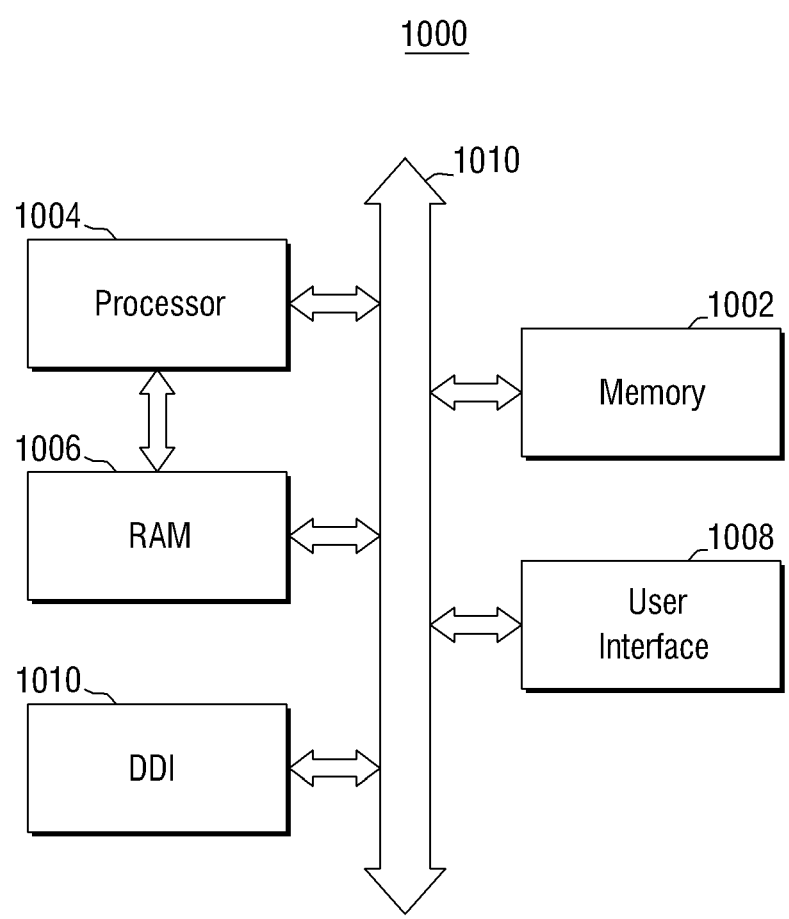
FIG. 12 is a block diagram illustrating a configuration of an electronic system according to at least one example embodiment of the inventive concepts.

FIG. 12 is a block diagram illustrating a configuration of an electronic system according to at least one example embodiment of the inventive concepts.

Referring to FIG. 12, the electronic system 1000 may include a memory system 1002, a processor 1004, a RAM 1006, a user interface 1008, and a DDI 1010.

The memory system 1002, the processor 1004, the RAM 1006, the user interface 1008, and the DDI 1010 may perform data communication with one another through a bus 1010.

The processor 1004 may execute a program and may control the electronic system 1000. The processor 1004 may include one or more of a microprocessor, a digital signal processor (DSP), a microcontroller and other logic elements capable of performing similar functions.

The RAM 1006 may be used as a working memory of the processor 1004. The RAM 1006 may include, for example, a volatile memory, such as a DRAM. Meanwhile, the processor 1004 and the RAM 1006 may be packaged into a single semiconductor device or package to be implemented.

The user interface 1008 may be used to input or output data to or from the electronic system 1000. Example of the user interface 1008 may include a key pad, a key board, an image sensor, a display device, and so on.

The memory system 1002 may store the codes for the operation of the processor 1004, the data processed by the processor 1004 or the externally input data. The memory system 1002 may include a separate driving controller and may be configured to additionally include an error correction block. The error correction block may be configured to detect an error of the data stored in the memory system 1002 using an error correction code (ECC) and to correct the error.

Meanwhile, in such an information processing system as a mobile device or a desktop computer, a flash memory may be mounted as the memory system 1002. The flash memory may be configured by a solid state drive (SSD). In this case, the electronic system 1000 can stably large-capacity data in the flash memory.

The memory system 1002 may be integrated into a single semiconductor device. In at least one example embodiment of the inventive concepts, the memory system 1002 may be integrated into a semiconductor device to constitute a memory card, and examples of the memory card may include a PC card such as a personal computer memory card international association (PCMCIA) card, a compact flash (CF) card, a smart media card (e.g., SM or SMC), a memory stick, a multimedia card (e.g., MMC, RS-MMC or MMC-micro), a SD card (e.g., SD, miniSD, microSD and SDHC), or a universal flash storage (UFS).

In at least one example embodiment of the inventive concepts, the DDI 1010 may employ the same configuration as the DDI 200 of each of the image processing devices 1 to 4.

Figure 13:
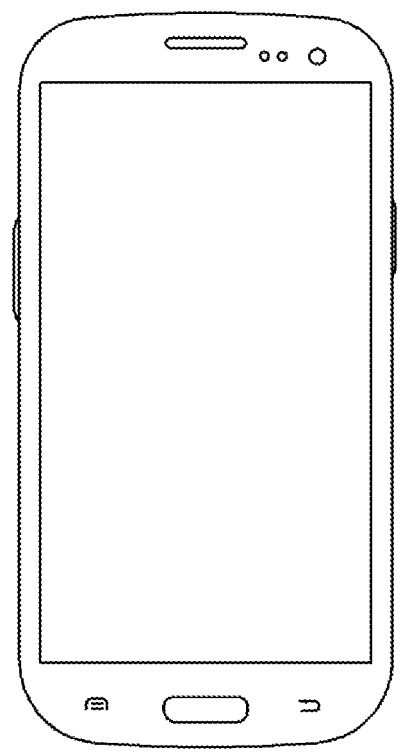
FIG. 13 illustrates an example in which the electronic system of FIG. 12 is applied to a smart phone.

The electronic system 1000 of FIG. 12 may also be applied to other electronic controllers of various electronic devices. For example, FIG. 13 illustrates an example in which the electronic system of FIG. 12 is applied to a smart phone 1001.

When the electronic system (1000 of FIG. 12) is applied to a smart phone 1001, some components of the electronic system (1000 of FIG. 12) may be implemented as application processors.

Figure 14:
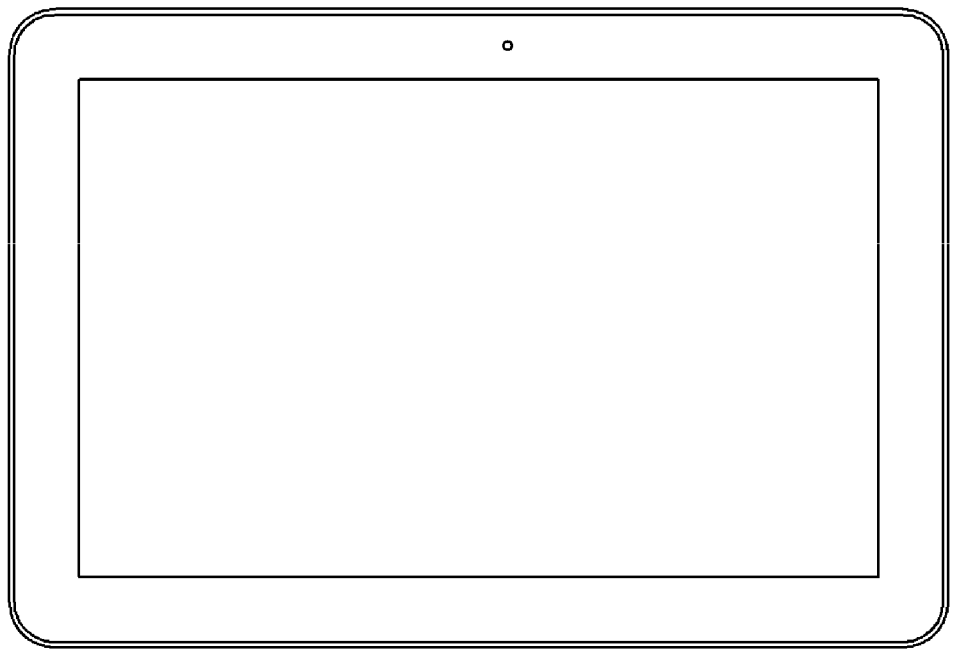
FIG. 14 illustrates an example in which the electronic system of FIG. 12 is applied to a tablet PC.
Figure 15:
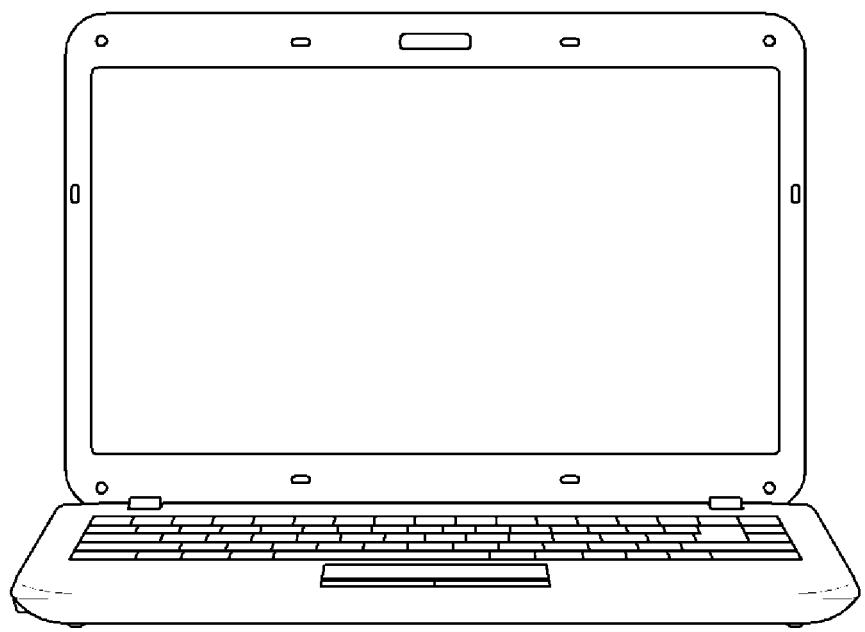
FIG. 15 illustrates an example in which the electronic system of FIG. 12 is applied to a notebook computer.

Meanwhile, the electronic system (1000 of FIG. 12) may also be applied to electronic devices other than listed herein. FIG. 14 illustrates an example in which the electronic system (1000 of FIG. 12) is applied to a tablet PC1100, and FIG. 15 illustrates an example in which the electronic system (1000 of FIG. 12) is applied to a notebook computer 1200.

In addition, the electronic system (1000 of FIG. 12) may be implemented as a personal computer, an ultra mobile personal computer (UMPC), a work station, a net-book, a personal digital assistant (PDA), a portable computer, a web tablet, a wireless phone, a mobile phone, an e-book, a portable multimedia player (PMP), a potable game console, a navigation device, a black box, a digital camera, a 3-dimensional (3D) television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, RFID devices, or embedded computing systems.

While the inventive concepts have been particularly shown and described with reference to example embodiments thereof, it will be understood by those of ordinary skill in the art that various changes in form and details may be made therein without departing from the spirit and scope of the inventive concepts as defined by the following claims.

It is therefore desired that example embodiments be considered in all respects as illustrative and not restrictive, reference being made to the appended claims rather than the foregoing description to indicate the scope of the inventive concepts.

What is claimed is:

1. An image processing device comprising:
   a memory storing computer-readable instructions;
   one or more processors configured to:
      execute the instructions,
      receive image data and gather statistics of color data from the image data,
      analyze the statistics of the color data;
      determine, based on the analyzing, whether the image data includes single color data or multi color data,
      determine a first gain value to perform an automatic white balance if the one or more processors determine that the image data includes multi color data,
      determine a second gain value different from the first gain value using a gain table if the one or more processors determine that the image data includes single color data, and
      apply the first gain value or the second gain value to the color data,
   wherein the one or more processors are configured to receive the image data and calculate the second gain value from the gain table based on a brightness value or a color distribution of the image data.

2. The image processing device of claim 1, wherein the one or more processors are configured to acquire the color distribution by calculating an average value of the color data or a weighted average value of the color data.

3. The image processing device of claim 1, wherein the image data includes a plurality of portions of image data acquired from a plurality of blocks of an input image.

4. The image processing device of claim 3, wherein each of the blocks includes a plurality of pixels.

5. The image processing device of claim 4, wherein the one or more processors are configured to receive the image data and gather the color data on a per block basis or a per pixel basis.

6. The image processing device of claim 1, wherein the one or more processors are configured to project the color data onto a color space and determine whether the color data is single color data or multi color data using the color space.

7. The image processing device of claim 6, wherein the color space includes a normalized color space, hue, saturation and intensity (HIS) color spaces, or a lab color space.

8. The image processing device of claim 6, wherein the one or more processors are configured to calculate a standard deviation value or a deviation value of the color data projected onto the color space and determine whether the color data is single color data or multi color data based on the standard deviation or the deviation value.

9. The image processing device of claim 6, wherein the one or more processors are configured to determine whether the color data is single color data using a principle component analysis (PCA) method.

10. An image processing system comprising:
    a first memory storing computer-readable instructions;
    one or more processors configured to:
       execute the instructions,
       divide image data into first to nth blocks, where n is a natural number of 2 or greater,
       gather statistics of first to nth color data for the first to nth blocks,
       analyze the statistics of the first to nth color data;

determine, based on the analyzing, whether the image data includes single color data, determine a gain value using a gain table if the one or more processors determine that the image data includes single color data, and apply the determined gain value to the first to nth color data; and an internal memory configured to store the gain table and supply the gain value to the one or more processors.

11. The image processing system of claim 10, wherein the one or more processors and the internal memory are part of an application processor.

12. The image processing system of claim 11, further comprising:

an external memory external to the application processor and configured to supply the image data to the image processing device.

13. The image processing system of claim 10, wherein the one or more processors are configured to calculate the gain value from the gain table based on a brightness value of the image data.

14. An image processing device comprising:

a memory storing computer-readable instructions;

one or more processors configured to:

execute the instructions, determine whether image data includes single color data or multi color data based on statistics of received color data, apply a first gain value to the image data if the one or more processors determine that the image data includes multi color data, the first gain value being associated with a white balance operation, and apply a second gain value to the image data if the one or more processors determine that the image data includes single color data, the second gain value being different from the first gain value, wherein the one or more processors are configured to retrieve the second gain value from a gain table based on a brightness value or a color distribution of the image data.

15. The image processing device of claim 14, wherein the one or more processors are configured to generate an image using the image data to which the first gain value or the second gain value is applied.

16. The image processing device of claim 14, wherein the one or more processors are configured to generate the color distribution by calculating an average value of the color data or a weighted average value of the color data.

* * * * *